Nov. 29, 1949 F. F. GUNTHER Re. 23,173

ELECTRICAL CONNECTION

Original Filed Nov. 5, 1945

Inventor
FREDERICK F. GUNTHER

By The Firm of Charles Neill Attys

Reissued Nov. 29, 1949

Re. 23,173

UNITED STATES PATENT OFFICE 23,173

ELECTRICAL CONNECTION

Frederick F. Gunther, Chicago, Ill., assignor to Helmco, Inc., Chicago, Ill., a corporation of Illinois Original No. 2,466,418, dated April 5, 1949, Serial No. 626,677, November 5, 1945. Application for reissue July 29, 1949, Serial No. 107,606

4 Claims. (Cl. 173—330)

The present invention relates to an electrical connection and more particularly to the mounting of the socket member of a separable electric connector in such manner that the socket member may swing as the plug member is withdrawn from it.

Soda fountains, lunch counters, and other places where short order meals are served utilize electrically heated cups for heating soups, milk, fudge, chocolate and the like, the cups being filled with the liquid to be heated and provided with the prongs of the plug member of a separable connector. The socket member is supported in a fixed manner, the cup being applied to and removed from the socket by push-pull movement. It oftentimes happens that an attendant, being in a hurry, while walking along a counter will grab the handle of a cup to disconnect it from the socket, while continuing walking. This imposes a sidewise strain between the prongs of the plug member and the sleeves of the receptacle or socket member, oftentimes breaking the receptacle members, thus requiring replacement.

It is therefore an important object of the present invention to provide a swivel mounting for the receptacle or socket of a two-part separable electrical connector used for the purposes above enumerated.

Another object of the present invention is to provide a swivel mounting for the receptacle or socket member of a two-part separable electrical connector whereby separation of the plug member from the receptacle member in any except a straight-line direction will cause the receptacle member to swing to maintain the prongs of the plug member and the sleeves of the receptacle member in alignment until the plug member is completely disconnected.

Another object of the present invention is to provide a swivel mounting for the receptacle or socket member of a two-part separable electrical connector so that the receptacle member may swing if, during the withdrawal of the plug member, sidewise strain is applied to the plug member.

The above, other further objects of the present invention will be apparent from the following description and accompanying drawings.

An embodiment of the present invention is illustrated in the accompanying drawing and the views thereof are as follows.

Figure 1:
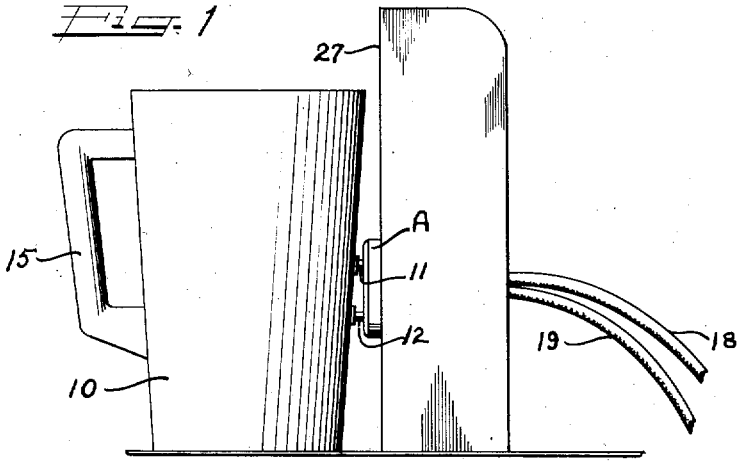
Figure 1 is a view in side elevation of a cup equipped with the prongs of a plug member of a separable connector applied to a socket of the present invention.

The drawing will now be explained.

Referring to Figure 1, a cup 10 is provided with prongs 11 and 12 for entering the sleeve conductors 13 and 14 of the receptacle A. The cup 10 is equipped with suitable resistance wiring to heat the contents thereof when the cup is placed in connection with an electrical circuit by the receptacle A. A handle 15 is mounted on the cup for ease in handling.

The receptacle A is of a known form, comprising two similar parts 16 and 17 separable along a median line and containing the conductor sleeves 13 and 14 to which conductor wires 18 and 19 are connected in the usual manner. The two parts 16 and 17 are held together by bolts passing through them and engaging nuts, the heads of the bolts and the nuts being in recesses to prevent short-circuiting.

In adapting such receptacle member for use in the present invention, a piece of suitable material, as a casing, is folded about the exterior of the receptacle with the ends overlapping and held in place by bolts 21 and 22 passing through the receptacle and casing in lieu of the bolts ordinarily used to hold together the parts 16 and 17 of the receptacle. The casing 20 has an extension 23 to receive the bolt 22 passing through the parts 16 and 17 of the receptacle.

It is to be understood that the casing 20 is applied after the conductor wires 18 and 19 have been connected to the sleeves 13 and 14, and the parts 16 and 17 assembled.

The casing 20 is provided with two pins 25 and 26 projecting from opposite margins of the receptable to constitute trunnions for mounting the receptacle to swing.

The receptacle is illustrated as mounted in a partition or wall 27, there being a suitable aperture 28 of proper size made in the partition 27.

While not essential, there is illustrated a slotted plate 29 secured to the rear surface of the partition wall 27 and having an opening 30 to conform to the opening 28 in the partition 27. The plate 29 is provided with upper and lower bent ends 31 and 32, with the extremities 33 and 34 thereof bent inwardly towards the plate. Each of these ends is apertured at 35 to receive one of the pins on the casing 20 so as to swivelly mount the receptacle in the plate. Bending of the ends in the manner stated creates a spring effect so as to assure engagement of the pins with the apertures in the fingers to hold the socket member in position for use.

The receptacle is installed by pushing the pins between the extremities of the fingers 31 and 32 so that these recede until the pins engage the apertures, whereupon the extremities spring into holding engagement with the pins and exert a slight frictional engagement against the casing 20.

The width of the opening 28 in the partition 27 and the corresponding opening or slot 30 in the plate 29 determines the extent of lateral swing of the receptacle, the width being greater than the thickness of the socket.

Figure 2:
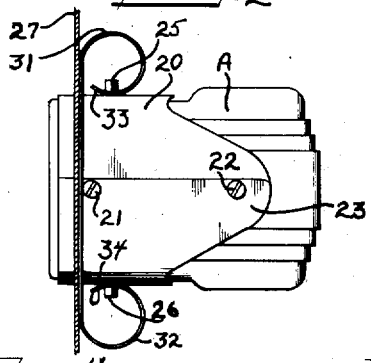
Figure 2 is a side elevational view of a swivelly supported receptacle member with enlarged side elevational view of the receptacle member, showing its manner of mounting to produce swivel action.
Figure 3:
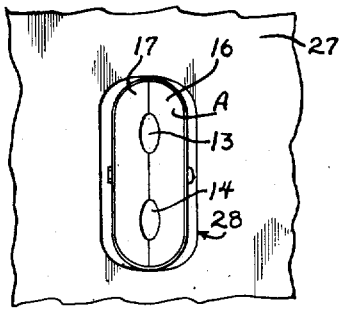
Figure 3 is an end elevational view of the receptacle and showing its relation to the margins of the openings through which it projects.
Figure 4:
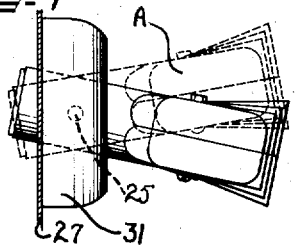
Figure 4 is a top plan view of the receptacle or socket, showing different angular positions it may assume.
Figure 6:
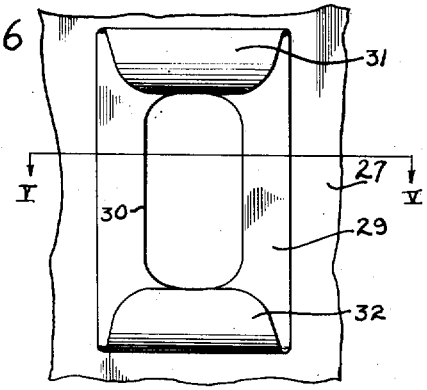
Figure 6 is an elevational view of the inside plate which supports the receptacle in position.
Figure 5:
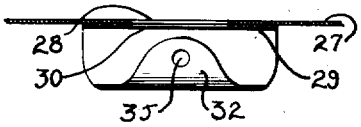
Figure 5 is a plan view of one of the bent spring fingers for supporting the receptacle in position.

The parts are so arranged that when the receptable or socket is in place the end thereof which receives the prongs 11 and 12 of the plug connector projects a slight distance beyond the surface of the partition or wall 27, as may be observed in Figures 1 and 2.

When it is desired to heat a liquid in the cup 10, the cup is filled with the liquid and then the attendant attaches the cup to a receptacle A supported in the partition or wall 27, in the manner heretofore described. After a sufficient length of time has elapsed the operator withdraws the cup from the receptacle by grasping the handle 15 and pulling the cup. Sometimes the operator will withdraw the cup while walking along the counter, thus tending to swing the handle of the cup in the direction she is moving. Such tendency to swing the cup imposes sidewise strain on the receptacle. Receptacle A, being pivoted or swiveled, will thus accommodate itself to the movement of the cup, so that the cup may be withdrawn in straight-line direction, thereby preventing any damage whatsoever to the receptacle or prongs 11 and 12.

While the invention has been described in connection with an electrically heated cup for fountain or lunch counter use, nevertheless it is to be understood that the invention is not limited by such use, as the invention can be used wherever it is necessary or desirable to mount the receptacle member of a two-part separable electrical connector for swinging movement.

The receptacle has herein been illustrated as swinging about a vertical axis. It is to be understood, of course, that the receptacle might be swung about a horizontal axis should occasion arise.

The invention has been described herein more or less precisely as to details, but it is to be understood that the invention is not to be limited thereby, since changes may be made in the arrangement or proportion of parts, and equivalents may be substituted, without departing from the spirit and scope of the invention.

I claim as my invention:

1. A swivel electrical connector for a hot cup comprising a vertically disposed wall member having an elongated aperture through it, a bracket secured to the inside of said wall having a part surrounding said aperture and having upper and lower bent ends with the extremities thereof curled towards each other and towards said wall and constituting spring fingers, said curled extremities having apertures in vertical alignment, one part of a two-part separable electrical connector having pins projecting from opposite margins thereof and entered in said apertures in said spring fingers to swivelly mount said one part on said wall with said part projecting through said aperture.

2. In a wall bracket for mounting the female portion of a two-part electrical connection having pivot pins in the casing thereof, the improvement which comprises a plate having means for securement to the wall and having an elongated aperture therethrough, spring members secured to said plate having spaced apart confronting end portions adjacent opposite ends of the aperture, said spring members having openings for receiving the pivot pins in pivoting relation and for preventing movement of the female portion away from the wall, said spring members being movable away from each other for facilitating the positioning of the pivot pins therein.

3. In a wall bracket for mounting the female portion of a two-part electrical connection having pivot pins in the casing thereof, the improvement which comprises a plate having means for securement to the wall and having an aperture larger than the cross-section of said female portion to freely receive the same therein, members secured to said plate providing spaced apart confronting ears at the opposite ends of said aperture, said ears having openings for receiving the pivot pins to swivelly mount and retain said female portion within said aperture.

4. A swivel electrical connector for a hot cup comprising a vertically disposed wall member having an aperture therethrough, a female portion of said electrical connector in said aperture, and spaced apart arm members having means for securement to the wall member at opposite sides of said aperture and having aligned openings, mounting plate portions on opposite sides of said female portion, fastening means for mounting said plate portions on said female portion, and pins on said plate portions arranged for pivotal engagement in said aligned openings to mount said female portion for swiveling movement within the wall member aperture.

FREDERICK F. GUNTHER.

REFERENCES CITED

The following references are of record in the file of this patent:

UNITED STATES PATENTS

| Number | Name | Date |
|---|---|---|
| 1,137,773 | Marsden | May 4, 1915 |
| 1,169,190 | Platt | Jan. 25, 1916 |
| 1,410,651 | Caps | Mar. 28, 1922 |
| 1,648,709 | Winsell | Nov. 8, 1927 |
| 1,854,865 | Snyder | Apr. 19, 1932 |
| 1,909,708 | Neuwirth | May 16, 1933 |
| 2,001,406 | Akers | May 14, 1935 |
| 2,259,072 | McDowell | Oct. 14, 1941 |

FOREIGN PATENTS

| Number | Country | Date |
|---|---|---|
| 602,648 | France | Mar. 23, 1926 |